US011911692B2

United States Patent
Törnqvist

(10) Patent No.: US 11,911,692 B2
(45) Date of Patent: Feb. 27, 2024

(54) METHOD FOR OPERATING A GAMING SYSTEM

(71) Applicant: Play'n Go Marks Ltd, Sliema (MT)

(72) Inventor: Johan Törnqvist, Sliema (MT)

(73) Assignee: Play'n Go Marks Ltd, Sliema (MT)

( * ) Notice: Subject to any disclaimer, the term of this patent is extended or adjusted under 35 U.S.C. 154(b) by 0 days.

(21) Appl. No.: 17/368,938

(22) Filed: Jul. 7, 2021

(65) Prior Publication Data

US 2022/0008823 A1 Jan. 13, 2022

(30) Foreign Application Priority Data

Jul. 8, 2020 (SE) ..................... 2050861-0

(51) Int. Cl.
*G07F 17/32* (2006.01)
*A63F 13/35* (2014.01)
*A63F 13/537* (2014.01)

(52) U.S. Cl.
CPC ............ *A63F 13/35* (2014.09); *A63F 13/537* (2014.09); *G07F 17/3218* (2013.01)

(58) Field of Classification Search
None
See application file for complete search history.

(56) References Cited

U.S. PATENT DOCUMENTS

| 8,241,127 | B2 | 8/2012 | Kovacs |
| 2006/0046849 | A1 | 3/2006 | Kovacs |
| 2013/0137509 | A1* | 5/2013 | Weber ................. G07F 17/3209 463/29 |
| 2014/0200065 | A1 | 7/2014 | Anderson et al. |
| 2015/0228153 | A1 | 8/2015 | Hedrick et al. |
| 2016/0019746 | A1 | 1/2016 | Lyons et al. |

FOREIGN PATENT DOCUMENTS

| WO | 2014135692 A1 | 9/2014 |
| WO | 2014150583 A1 | 9/2014 |

OTHER PUBLICATIONS

Swedish Search Report dated Mar. 26, 2021 for Swedish Patent Application No. 2050861-0, 2 pages.
Extended European Search Report dated Oct. 15, 2021 for EP Application No. 21183870.1, 6 pages.

* cited by examiner

*Primary Examiner* — Damon J Pierce
(74) *Attorney, Agent, or Firm* — RMCK Law Group, PLC

(57) ABSTRACT

The present disclosure generally relates to a computer implemented method for operating a gaming system, and specifically a scheme for allowing an electronic user device to control e.g. a gaming machine such as a slot machine. The present disclosure also relates to a corresponding gaming system and computer program product.

13 Claims, 2 Drawing Sheets

METHOD FOR OPERATING A GAMING SYSTEM

CROSS-REFERENCE TO RELATED APPLICATIONS

This application claims priority to Swedish Patent Application No. 2050861-0, filed on Jul. 8, 2020. The disclosure of the above application is incorporated herein by reference in its entirety.

TECHNICAL FIELD

The present disclosure generally relates to a computer implemented method for operating a gaming system, and specifically a scheme for allowing an electronic user device to control e.g. a gaming machine such as a slot machine. The present disclosure also relates to a corresponding gaming system and computer program product.

BACKGROUND

Games of chance are known and widely played for recreational purposes. The gaming industry has come to recognize that to sustain long term success it must be constantly innovative in introducing new games and new gambling concepts to the gaming public. Recently, an increased amount of gaming is involving a gaming software adapted to be executed at an electronic device of an end user, such as at a computer, a tablet or a mobile phone.

However, dedicated gaming machine will generally provide a further level of entertainment for the user, since the hardware possibly may be targeted towards specific options of the game itself. Such gaming machines may for example providing games such as electronically driven video slots, video poker, video blackjack, video keno, video bingo, video pachinko, video lottery, and mechanically driven reel slots, etc., all being well known in the gaming industry. Generally, video gaming machines are configured with a main video display for displaying video game images including video images representing game play outcome (e.g., simulated reel symbols in the case of a slot game, simulated cards, simulated numbers, etc.). Mechanical spinning reel slot machines, on the other hand, generally include a main reel display area configured to allow a player to view a reel symbol array provided by the stopped mechanical spinning reels.

There is always a drive towards further engaging a player to spend as much as possible playing a game at such a gaming machine. For example, to improve the ergonomic experience when playing the game, it has been proposed to "move" the control of the operation of the gaming machine from the gaming machine itself to a dedicated and removable wireless remote-control device. Using the removable wireless remote-control device, the player may be allowed to operate the game in a better ergonomic position. An example of such a set-up is for example disclosed in U.S. Pat. No. 8,241,127.

However, recent problems with pandemic diseases have greatly reduced the desire for players to interact with any form of devices that are possibly shared with persons unknown to the players. Accordingly, the implementation proposed in U.S. Pat. No. 8,241,127 is in great contradiction with what is desired by a modern player.

Another a prior art disclosure of operating a gaming machine is presented in US20140200065. The solution as is presented in US20140200065 is however not suitable for use in relation to a gaming environment where multiple potential players are present at the same time.

Thus, with the above in mind and with an ongoing desire to provide improvements of such gaming machines for retaining end users at the gaming machine for a prolonged duration, it is desirable to ensure that the gaming environment is safe for the player when operating the gaming machine, still taking into account the ergonomics when playing a game.

SUMMARY

According to an aspect of the present disclosure, the above is at least partly alleviated by a computer implemented method for operating a gaming system, the gaming system comprising a server and a gaming machine, the server arranged in network communication with the gaming machine, wherein the method comprises presenting, at a graphical user interface (GUI) of the gaming machine, a user interface for a first game, providing, at the gaming machine, an identifier arranged to identify the gaming machine, receiving, at the server and from a first electronic user device operated by a first player, a request to operate at least a portion of the first game using the first electronic user device, wherein the request comprises a representation of the identifier and an identity of the first player, assigning, using the server, the gaming machine to the first electronic user device, providing, from the server to the first electronic user device, information to be visualized at a GUI of the first electronic user device for operating the first game at the gaming machine, and operating, using the server, the first game at the gaming machine based on interaction of the first player at the GUI of the first electronic user device.

By means of the present disclosure, it is thus provided a scheme allowing the first player to use his own dedicated electronic user device rather than relying on using a dedicated remote-control device as is proposed in accordance to prior-art. Furthermore, the present disclosure allows playing at the gaming machine to be performed in a safer manner as compared to prior-art, since playing at the gaming machine only will be allowed in case an identity of the first player has been successfully verified.

Furthermore, in accordance to the present disclosure the server will be in control of what information to distribute to the gaming machine and to the first electronic user device. Accordingly, since the control lies within the hands of the server, it will in an advantageous way be possible to manage the first game at the gaming device, as well as controlling that the player plays within for example pre-set boundaries or for allowing different players to be given different advantages when playing a game. Additionally, using the server-based approach allows for the player to move between different gaming machines without having to first cash-out from one gaming machine before operating the second gaming machine, saving time and personnel in handling e.g. cash-payouts. Rather, the funding for playing different games may be fully electronic and connected to a user account of the first player.

One further advantage with the present disclosure is that it may be possible for the first player to operate more than a single gaming machine. That is, the GUI of the first electronic user device may potentially be arranged to include means for simultaneously or sequentially operate for example a first and second gaming machine.

A still further advantage following the present disclosure lies in the fact that the computational efforts at the gaming machine may be reduced, since the server will handle all gaming operation. The gaming machine will rather function as a "front" for the game, without necessarily providing all the general functionality as is normal in e.g. a casino environment. The gaming machine may thus potentially be less costly and thus allow for an increase revenue for the operator of the casino environment.

In one embodiment of the present disclosure the identifier comprises generating a computer readable code to be acquired at the gaming machine using the first electronic device. The computer readable code may for example be a bar code, such as a 2D or a 3D bar code, including so called QR codes. Such a bar code may for example be acquired using a camera comprised with the first electronic user device.

However, it should be understood that computer readable code may be provided in an electronic manner, meaning that the computer readable code could be acquired electronically/wirelessly using the first electronic user device. For example, in some embodiments the first electronic user device may be equipped with an RFID of NFC reader for acquiring the computer readable code.

In some embodiments the information to be visualized at the first electronic device is formed at the server and comprises means for allowing the first player to operate the portion of the first game. As such, the information provided to the first electronic device may be used for defining e.g. one or a plurality of "virtual buttons" at the GUI of the first electronic device, allowing the first player to e.g. select a bet as well as for initiating the game.

Furthermore, it may in line with the present disclosure be possible to allow operating the first game at the gaming machine to comprise receiving game control commands from the GUI visualized at the first electronic device, generating a graphical representation of a current status of the first game, and distribute a first portion of the graphical information to the gaming machine and a second portion of the graphical information to the first electronic device.

Accordingly, once the server receives the request from the first electronic user device to "activate" the game, the server will form information to be distributed to the gaming machine and the first electronic user device. Preferably, the information to be distributed to the separate devices may be at least partly different. In a possible implementation, the information distributed to the gaming machine relates to e.g. spinning reel symbols, whereas the information distributed to the first electronic user device generally relates to the above-mentioned virtual control buttons, information about an outcome of the game, information about a current total fund, etc.

In line with the present disclosure and as discussed above, the GUI of the first electronic device is preferably arranged to allow the first player to decide on a level of a contribution to participate in the first game, e.g. defined as a "bet". This information is as mentioned above provided from the first electronic device to the server. Likewise, if the first player is successful in playing the first game, the server may be arranged to provide an award to the first electronic device. The award may be stored with the total funding hold by the first player.

To further enhance the security of the gaming system, it may additionally be possible to form a gaming session between the first electronic device and the gaming machine, the gaming session having a predefined duration. Accordingly, once the server has established a secure connection between the gaming machine and the first electronic device, the session is formed, and the first player may play the first game provided at the gaming machine. However, if for some reason it is decided by e.g. the server, the first electronic device or the gaming machine that there is some form of error in communication, breach of security, etc. then the gaming session may be e.g. directly ended. Once ended, the first electronic device may no longer control the gaming machine, and the first game is ended.

The gaming session further has a predefined duration. The predefined duration may in some embodiments be set by an operator of the first game. Additionally, the predefined duration may be continuously updated as long as the first player continues to play the first game.

The first game may preferably be a game of chance, however it may also be possible to allow the first game to be a game of skill, where the outcome of the game of skill is determined mainly by mental or physical skill. The concept according to the present disclosure is likewise applicable to either of the types of games.

According to another aspect of the present disclosure there is provided a gaming system, the gaming system comprising a server and a gaming machine, the server arranged in network communication with the gaming machine, wherein the gaming system is adapted to present, at a graphical user interface (GUI) of the gaming machine, a user interface for a first game, provide, at the gaming machine, an identifier arranged to identify the gaming machine, receive, at the server and from a first electronic user device operated by a first player, a request to operate at least a portion of the first game using the first electronic user device, wherein the request comprises a representation of the identifier and an identity of the first player, assign, using the server, the gaming machine to the first electronic user device, provide, from the server to the first electronic user device, information to be visualized at a GUI of the first electronic user device for operating the first game at the gaming machine, and operate, using the server, the first game at the gaming machine based on interaction of the first player at the GUI of the first electronic user device. This aspect of the present disclosure provides similar advantages as discussed above in relation to the previous aspects of the present disclosure.

Preferably, the gaming system is a cloud-based computing system and the server is a cloud server. Thus, the computing power provided by means of the present disclosure may be distributed between a plurality of servers, and the location of the servers must not be explicitly defined. Advantageous following the use of a cloud-based solution is also the inherent redundancy achieved.

In some embodiments the first electronic user device may be selected to include e.g. a computer (laptop/stationary), a mobile phone, a tablet, a (gaming) console or any other gaming device and gambling terminals. The GUI may in some embodiments be allowed to depend on the type of electronic user device.

According to a still further aspect of the present disclosure there is provided a computer program product comprising a computer readable medium having stored thereon computer program means for operating a gaming system, the gaming system comprising a server and a gaming machine, the server arranged in network communication with the gaming machine, wherein the computer program product comprises code for presenting, at a graphical user interface (GUI) of the gaming machine, a user interface for a first game, code for providing, at the gaming machine, an identifier arranged to identify the gaming machine, code for receiving, at the server and from a first electronic user device operated by a first player, a request to operate at least a portion of the first game using the first electronic user device, wherein the request comprises a representation of the identifier and an identity of the first player, code for assigning, using the server, the gaming machine to the first electronic user device, code for providing, from the server to the first electronic user device, information to be visualized at a GUI of the first electronic user device for operating the first game at the gaming machine, and code for operating, using the server, the first game at the gaming machine based on interaction of the first player at the GUI of the first electronic user device. Also this aspect of the present disclosure provides similar advantages as discussed above in relation to the previous aspects of the present disclosure.

The computer program product is typically executed using a computing device comprised with the server, preferably including a microprocessor or any other type of computing device. Similarly, a software executed by the server for operating the gaming system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawing, in which.

DETAILED DESCRIPTION

Figure 1:
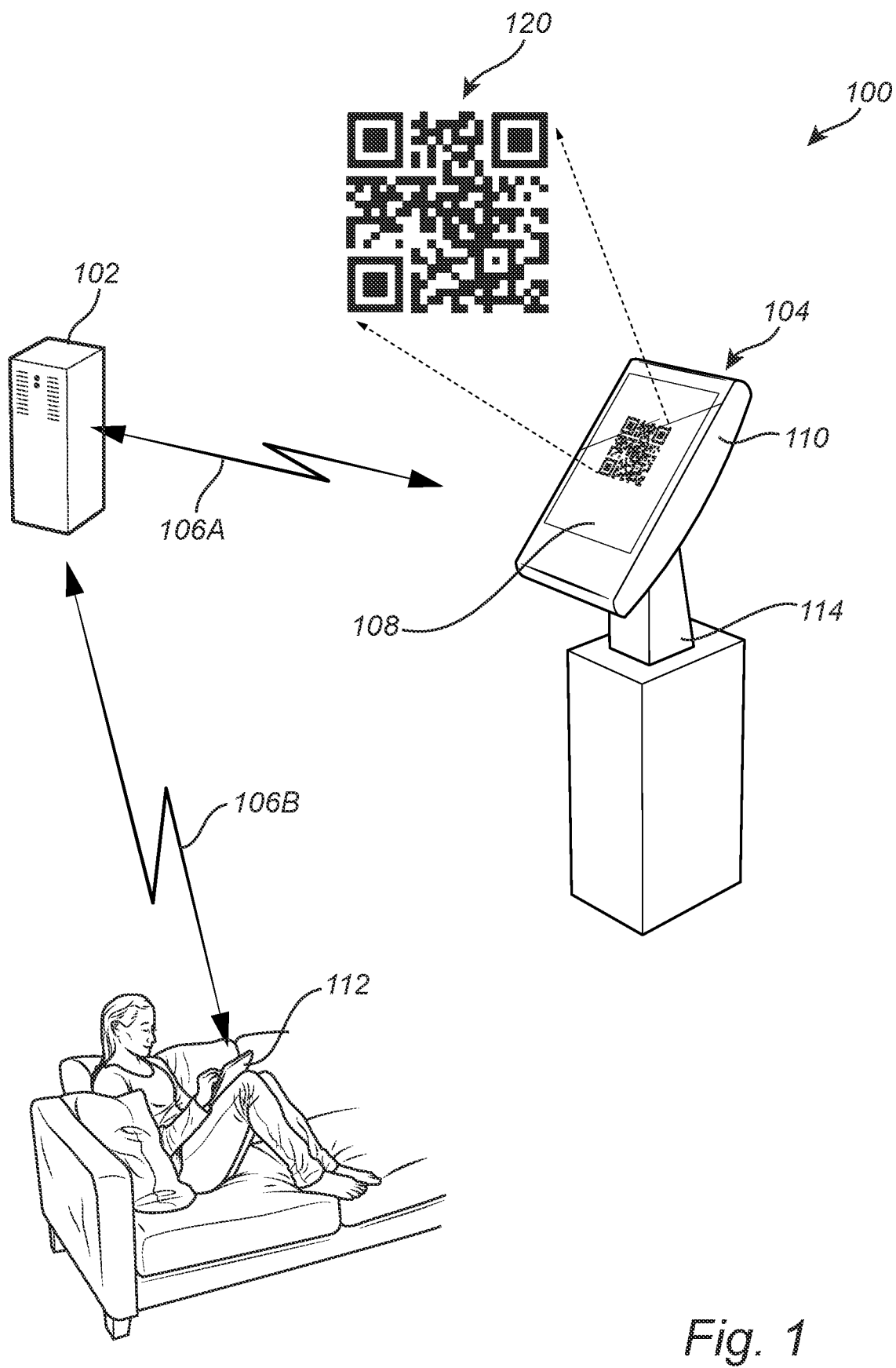
FIG. 1 illustrates a gaming establishment where a gaming system according to the present disclosure is provided.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout.

Referring now to the drawings and to FIG. 1 in particular, there is depicted a gaming establishment, such as e.g. a casino or similar, where a gaming system 100 according to the present disclosure is provided. The gaming system 100 comprises a server 102 and a gaming machine 104, where the server 102 and the gaming machine 104 are arranged to communicate over a network 106A, such as using a WAN or a WLAN connection therebetween.

The gaming machine 104 comprises a display screen 108 adapted to display a graphical user interface (GUI) as well as a housing 110.

The gaming machine 104 further comprises a first user interface to be operated by a user of the gaming machine 104 for interacting with a game that is shown at the display screen 108. The GUI of the gaming machine 104 is preferably provided for displaying gaming information that the user is interacting with when playing a game, such as to execute actions within the game. Accordingly, the gaming machine 104 may be allowed to be directly controlled at the location of the gaming machine 104 using the GUI shown at the display screen 108. It should be understood that player interaction with the gaming machine 104 at the location of the gaming machine 104 also may be done using e.g. buttons arranged at the gaming machine 104.

The gaming machine 104 further comprises a control unit (not explicitly shown), where the control unit connected to the display and the first and the second user interface. For reference, the control unit may be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

In line with the present disclosure the gaming machine 104 is also controllable using a first electronic user device operated by a first player, such as a mobile phone 112 associated with the first player. The mobile phone 112 is also arranged in in communication with the server 102, typically using a wireless network connection 106B. The wireless network connection may for example be implemented using WLAN, CDMA, GSM, GPRS, 3G mobile communications, 4G mobile communications, 5G mobile communications, Bluetooth, infrared, or similar. In some embodiments it may be desirable to ensure that the mobile phone 112 is securely connected to the server 102, e.g. using a https communication protocol.

It should be understood that the server 102 must not necessarily be physically located at the gaming establishment. Rather, as mentioned above the server 102 may be provided using a cloud-based implementation, whereas the server 102 may be seen as a so called cloud server. Thus, the computing power provided by means of the server 102 may be distributed between a plurality of servers, where the location of the plurality of servers must not be explicitly defined.

Figure 2:
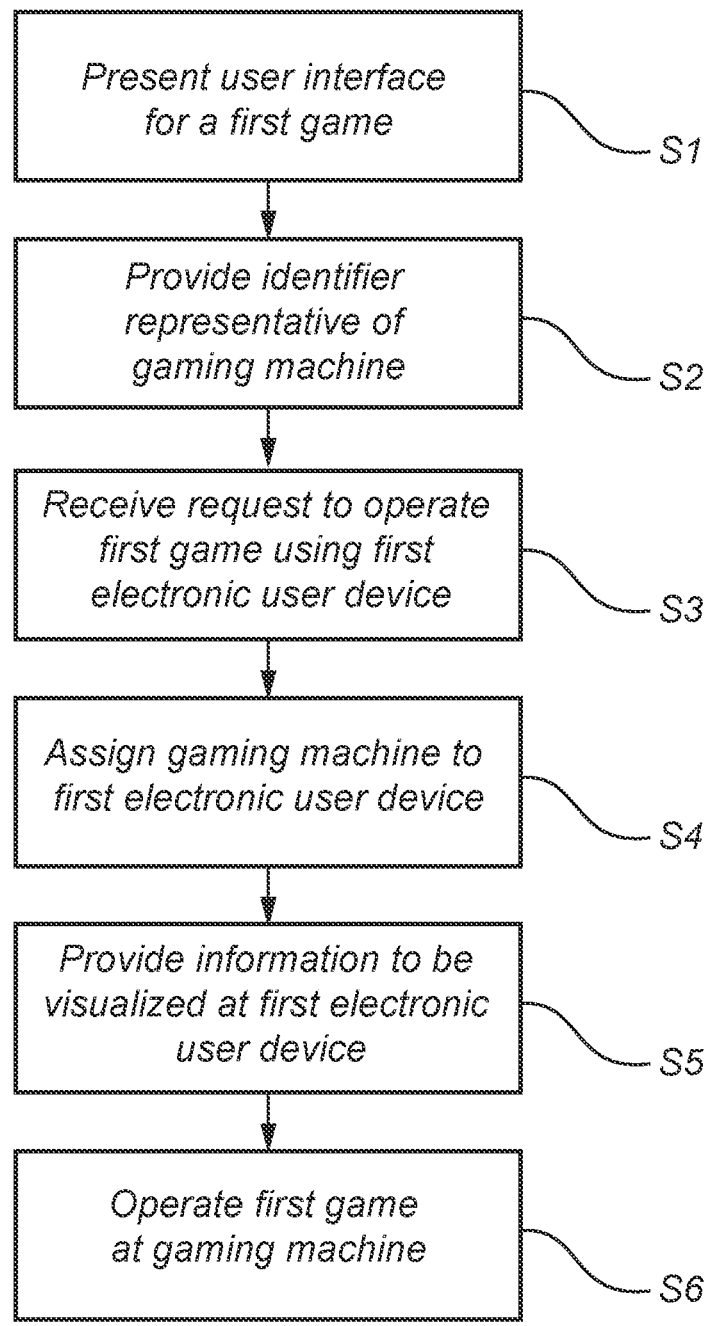
FIG. 2 is a flow chart illustrating the exemplary steps for operating the gaming system as shown in FIG. 1.

During operation gaming system 100, with further reference to FIG. 2, the server 102 presents, S1, at a graphical user interface (GUI) of the gaming machine 104, the above-mentioned user interface for a first game, such as a game of chance. At the gaming machine 104 there is also provided, S2, an identifier representative of the gaming machine 104, where the identifier is intended to be used for identifying the specific gaming machine 104 among a plurality of gaming machines. Accordingly, it is desirable that each gaming machine is assigned an individual identifier. The identifier is preferably a computer readable code, for example shown as a QR code 120 within the GUI shown at the display screen 108 of the gaming machine 104. However, the identifier could also or instead be provided as a "QR code sticker" positioned at the housing 110 of the gaming machine 104. It should also be understood that the gaming machine 104 in an alternative embodiment may be equipped with a Bluetooth, NFC or RFID transmitter, where the transmitter is arranged to wirelessly transmit the computer readable code.

Once a player wants to interact with the gaming machine, the player uses his mobile phone 112 to "read" the computer readable code. Accordingly, the mobile phone 112 may be equipped with a camera for reading the QR code shown at the gaming machine 104, a Bluetooth, NFC or RFID receiver, or any other input means, arranged to receive and interpret the computer readable code.

The server 102 will subsequently receive, S3, a request from the mobile phone 112 to operate at least a portion of the first game presented at the gaming machine 104 using the mobile phone 112. In line with the present disclosure, the request comprises a representation of the identifier (i.e. the computer readable code acquired using the mobile phone 112) and an identity of the first player. The identity of the first player may for example be based on the first player signing into a gaming site with a user identity and thereto related password. Accordingly, in some embodiment of the present disclosure it may be desirable and advantageous to allow the first player to download a dedicated application (app) to the mobile phone 112, allowing the first player to as a first step sign in to a gaming site associated with the first game to be played at the gaming machine 104.

In some embodiments it may be desirable to separate the user signing into the server 102 and the provision of the gaming machine identifier to the server 102. Specifically, in some embodiments it may be desirable to include a two-step authentication where the user is first authenticated before the user is allowed to provide the gaming machine identifier to the server 102. Such an implementation may allow for the server 102 to e.g. even better ensure that only allowed players are given the permission to operate the game.

The two-step authentication process may also be used for interacting with the player before the player proceeds to e.g. scan a QR code at the gaming machine. The interaction with the player may for example be used for guiding the player to a specific gaming machine that may be of specific interest for the player, or a gaming machine that is currently less "occupied" as compared to other gaming machines. As such, players may be "controlled" in such a manner that they are evenly distributed among different gaming machines e.g. within the above mentioned gaming environment (such as a casino). Such control may better make use of the available gaming machines and at the same time reduce a condensation of players in specific spots.

Once the first player has been successfully identified and provided the identifier for a specific gaming machine 104 with which the first player wants to interact, then the server 102 assigns, S4, the gaming machine 104 to the mobile phone 112. Essentially, in such an implementation it may be allowed to arrange the gaming machine 104 to only be operated by the first player using the mobile phone 112. However, in some other implementations it could be possible to allow multiple players to be assigned to a common gaming machine 104. As mentioned above, assigning the gaming machine 104 to the mobile phone 112 may also include forming a gaming session between the gaming machine 104 and the mobile phone 112, where the gaming session has a predefined duration. The duration may for example be set to 5 minutes (or less or more), meaning that in case the first player is inactive for more than 5 minutes then the gaming machine 104 is released from the mobile phone 112, allowing other players to interact with the gaming machine 104.

The server 102 will further provide, S5, information to the mobile phone 112 to be visualized at a GUI of the mobile phone 112 for operating the first game at the gaming machine. As mentioned above, such means for operating the gaming machine 104 may include virtual buttons, etc.

The server 102 is further arranged to receive gaming commands from the mobile phone 112, i.e. as a result of the first player "pushing" the virtual buttons at the GUI of the mobile phone 112. The gaming commands will in turn be used by the server 102 for operating, S6, the first game at the gaming machine. As has been discussed above, the GUI of the mobile phone 112 is generated based on information provided from the server 102. For example, the server 102 may provide the mobile phone 112 with a complete user interface that is visualized within the GUI. As an example, the server 102 may generate a "web page" comprising the buttons etc. that are to be used for operating the game. The mobile phone 112 will then render the content within the GIU.

In an alternative embodiment the server 102 provides the mobile phone 112 with e.g. metadata that is used by the mobile phone 112 to generate the user interface for the game, i.e. within the GUI of the mobile phone 112.

As understood from the above, the general operation of the first game is performed at the server 102, rather than at the gaming machine 104. Accordingly, in line with the present disclosure the gaming machine 104 is more functioning as a "front" for the game, and all gaming related decisions are made by the server 102.

In summary, the present disclosure relates to a computer implemented method for operating a gaming system, the gaming system comprising a server and a gaming machine, the server arranged in network communication with the gaming machine, wherein the method comprises presenting, at a graphical user interface (GUI) of the gaming machine, a user interface for a first game, providing, at the gaming machine, an identifier representative of the gaming machine, receiving, at the server and from a first electronic user device operated by a first player, a request to operate at least a portion of the first game using the first electronic user device, wherein the request comprises a representation of the identifier and an identity of the first player, assigning, using the server, the gaming machine to the first electronic user device, providing, from the server to the first electronic user device, information to be visualized at a GUI of the first electronic user device for operating the first game at the gaming machine, and operating, using the server, the first game at the gaming machine based on interaction of the first player at the GUI of the first electronic user device.

Advantages with the present disclosure includes an improved way of interacting with the gaming machine, without having to necessarily be in physical contact with the gaming machine at any time when playing the game. Additional advantages with present disclosure relate to the fact that the gaming machine may only be allowed to be operated by the first player in case an identity of the first player has been successfully verified.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

The invention claimed is:

1. A computer implemented method for operating a gaming system, the gaming system comprising a server and a gaming machine, the server arranged in network communication with the gaming machine, wherein the method comprises:

presenting, at a graphical user interface (GUI) of the gaming machine, a user interface for a first game,
providing, at the gaming machine, an identifier arranged to identify the gaming machine,
receiving, at the server and from a first electronic user device operated by a first player, a request to operate at least a portion of the first game using the first electronic user device, wherein the request comprises a representation of the identifier and an identity of the first player,
assigning, using the server, the gaming machine to at least the first electronic user device by forming, using the server, a gaming session between the first electronic device and the gaming machine, the gaming session having a predefined duration,
providing, from the server to the first electronic user device and for the predefined duration of the gaming session, information to be visualized at a GUI of the first electronic user device for operating the first game, and
operating the first game at the server, for the predefined duration of the gaming session, based on interaction of the first player at the GUI of the first electronic user device,
wherein the server:
forms parallel gaming sessions between the gaming machine and further electronic devices different from the first electronic device, in addition to the gaming session between the first electronic user device and the gaming machine, and
allows each of the further electronic devices to operate the first game at the server based on GUI interactions at the respective further electronic user devices.

2. The method according to claim 1, wherein providing the identifier comprises generating a computer readable code to be acquired at the gaming machine using the first electronic device.

3. The method according to claim 2, wherein the computer readable code is a bar code.

4. The method according to claim 1, wherein the information to be visualized at the first electronic device is formed at the server and comprises means for allowing the first player to operate the portion of the first game.

5. The method according to claim 1, further comprising:
providing, by the server, an award to the first electronic device if an outcome of the first game is successful.

6. The method according to claim 1, further comprising:
receiving, at the server and from the first electronic device, a contribution to participate in the first game.

7. A gaming system, the gaming system comprising a server and a gaming machine, the server arranged in network communication with the gaming machine, wherein the gaming system is adapted to:

present, at a graphical user interface (GUI) of the gaming machine, a user interface for a first game,
provide, at the gaming machine, an identifier arranged to identify the gaming machine,
receive, at the server and from a first electronic user device operated by a first player, a request to operate at least a portion of the first game using the first electronic user device, wherein the request comprises a representation of the identifier and an identity of the first player,
assign, using the server, the gaming machine to at least the first electronic user device by forming, using the server, a gaming session between the first electronic device and the gaming machine, the gaming session having a predefined duration,
provide, from the server to the first electronic user device and for the predefined duration of the gaming session, information to be visualized at a GUI of the first electronic user device for operating the first game, and operate the first game, for the predefined duration of the gaming session, based on interaction of the first player at the GUI of the first electronic user device, wherein the server:
  forms parallel gaming sessions between the gaming machine and further electronic devices different from the first electronic device, in addition to the gaming session between the first electronic user device and the gaming machine, and
  allows each of the further electronic devices to operate the first game at the server based on GUI interactions at the respective further electronic user devices.

8. The gaming system according to claim 7, wherein providing the identifier comprises generating a computer readable code to be acquired at the gaming machine using the first electronic device.

9. The gaming system according to claim 8, wherein the computer readable code is a bar code.

10. The gaming system according to claim 7, wherein the information to be visualized at the first electronic device is formed at the server and comprises means for allowing the first player to operate the portion of the first game.

11. The gaming system according to claim 7, wherein the gaming system is further adapted to:
  provide, by the server, an award to the first electronic device if an outcome of the first game is successful.

12. The gaming system according to claim 7, wherein the gaming system is further adapted to:
  receive, at the server and from the first electronic device, a contribution to participate in the first game.

13. A non-transitory computer-readable storage medium comprising instructions, which when executed by a processor, cause the processor device to perform operations for operating a gaming system, the gaming system comprising a server and a gaming machine, the server arranged in network communication with the gaming machine, the operations comprising:
  presenting, at a graphical user interface (GUI) of a gaming machine, a user interface for a first game,
  providing, at the gaming machine, an identifier arranged to identify the gaming machine,
  receiving, at the server and from a first electronic user device operated by a first player, a request to operate at least a portion of the first game using the first electronic user device, wherein the request comprises a representation of the identifier and an identity of the first player,
  assigning, using the server, the gaming machine to at least the first electronic user device by forming, using the server, a gaming session between the first electronic device and the gaming machine, the gaming session having a predefined duration,
  providing, from the server to the first electronic user device and for the predefined duration of the gaming session, information to be visualized at a GUI of the first electronic user device for operating the first game, and
  operating the first game at the server, for the predefined duration of the gaming session, based on interaction of the first player at the GUI of the first electronic user device, wherein the server:
  forms parallel gaming sessions between the gaming machine and further electronic devices different from the first electronic device, in addition to the gaming session between the first electronic user device and the gaming machine, and
  allows each of the further electronic devices to operate the first game at the server based on GUI interactions at the respective further electronic user devices.

* * * * *